May 30, 1967

H. ENGELEN ETAL 3,322,221

PNEUMATIC LIFTING DEVICE AND WEIGHER FOR FLAT GOODS

Filed Oct. 22, 1965

Heinz Engelen
Helmut Dischler
Günter Albert
INVENTORS.

BY

Karl F. Ross

Attorney

United States Patent Office 3,322,221
Patented May 30, 1967

3,322,221
PNEUMATIC LIFTING DEVICE AND WEIGHER FOR FLAT GOODS
Heinz Engelen, Dusseldorf, Helmut Dischler, Neuss-Udesheim, and Günter Albert, Dusseldorf, Germany, assignors to Maschinenfabrik Hasenclever A.G., Dusseldorf, Germany, a corporation of Germany
Filed Oct. 22, 1965, Ser. No. 504,294
Claims priority, application Germany, Oct. 24, 1964, M 62,879
16 Claims. (Cl. 177—208)

ABSTRACT OF THE DISCLOSURE

A lifting head for raising sheet material and other flat goods having a cylinder open in the direction of the goods and a piston head movable in the cylinder for forming a partial vacuum therein, a suspension device being provided for drawing the piston head upwardly and an annular seal being provided between the piston and the cylinder and in all-around fixed peripheral engagement therewith and with the piston head to maintain the suction below the piston head. The annular seal is a flexible membrane of annular configuration having its inner periphery clamped to the piston head and its outer periphery clamped between housing parts forming the cylinder. A manually operable lever is provided for venting the partial vacuum to the atmosphere.

---

This application is a continuation-in-part of our copending application Ser. No. 405,394, filed October 21, 1964.

The present invention relates to improvements in a lifting device for flat goods of the type generally described in commonly assigned copending application Ser. No. 405,394, filed October 21, 1964. In this application, there is described a device for lifting or upwardly deflecting boards, sheet-metal plates and other flat goods and, especially, fiberboard and materials of this character which comprises a cylinder with a substantially vertical axis in which a piston head is axially movable under the control of a rod forming a suspension means for the assembly whereby, upon elevation of the rod, a partial vacuum develops below the piston head and serves to hold the flat goods to the bottom of the cylinder.

As pointed out in the application, the device can be provided with means for selectively triggering the development of the partial vacuum or preventing its development so that the goods can be selectively engaged or released. Moreover, the cylinder can be provided with swivellable heads or a single swivellable head to accommodate itself to various positions of the goods which it is to engage or deposit. In devices of this general type and in the more usual case of lifting devices having cylinders and piston heads reciprocable therein, a seal is usually provided between the piston wall and the cylinder wall either by mounting the sealing means on the cylinder wall for engagement with a cylindrical surface of the piston head or by mounting the sealing means in a disk-shaped or cylindrical piston head for engagement with the cylindrical wall of the cylinder. It has now been found, after much work with devices of this type, that the sealing arrangement between the cylinder head and cylinder is highly unsatisfactory in that, when the seal is fresh, the friction force between the cylinder head and the piston head frequently is sufficient to cause the cylinder to rise upwardly along with the piston head when the rod is entrained by the suspension means. This presents the development of the necessary partial vacuum and indeed withdraws the entire device from the goods which it is intended to lift. As the seal ages, however, there is a loss of suction and, in a relatively short time, the device becomes unusable unless the seat is replaced, whereupon the problems arising with new seals again develop. The difficulties are increased by the fact that the sealing ring frequently hardens and becomes brittle so that fracture or rupture of the sealing ring can occur with consequent loss of vacuum. The problems are increased moreover, by the fact that the cylinder is of relatively light weight and cannot resist upward displacement by the piston head when the sealing rings engage the cylinder wall with considerable friction force.

It is therefore, the principal object of the present invention to provide a lifting device for flat goods of the general character described wherein the disadvantages uncovered with respect to the sealing device can be eliminated.

A further object to this invention is to improve upon the principles laid down in the aforementioned copending application, and, consequently to provide a lifting device having a cylinder and piston-head assembly in which the seal between the cylinder and piston head does not have to be replaced frequently and which, therefore, has a relatively long useful life and little down time.

The aforementioned objects and others which will become apparent hereinafter, are attained, in accordance with the present invention, by providing a device for lifting flat goods and the like which comprises a cylinder and a piston head reciprocable therein, generally under the control of a suspension rod, and which includes an annular flexible sealing means having an outer periphery fixed to the cylinder wall and preferably clamped between a pair of axially abutting cylinder portions, and an inner periphery fixed to the piston head, preferably by a clamping ring provided with a recess receiving a bead of the sealing means and holding the sealing means in all-around engagement with an upwardly convergent conical surface of the piston head. More specifically, the sealing means can be described as rollable membrane of a flexible material (such as leather, rubber or synthetic resin) which has a circumferential bead on its outer periphery for engagement by an annular recess in a surface of one of the cylinder portions extending transversely to the cylinder axis whereby the other cylinder portion clamps this bead within the recess. The sealing member advantageously lies along the inner wall of the cylinder especially when the piston head is in its lowest position.

Advantageously, the device is provided with a valve means which can be manually or automatically controlled (e.g. as described in the aforementioned copending application) for selectively connecting the suction space between the suction head below the cylinder and the atmosphere so that the goods can be readily released and the device again prepared for picking up a further sheet of material. The venting means advantageously includes a valve member cooperating with axially extending rods and adapted to block a venting aperture between the suction space and the atmosphere when the rod is drawn upwardly. The rod can be axially displaced by the suspension means which may include an eye rigid with the rod or via fluid-responsive means including a piston and a cylinder bore supplied with pressure medium from a control valve or the like.

According to a more specific feature of this invention, the valve means is controlled from the upper end of the cylinder via, for example, an actuating element for manual operation of the valve means or a pawl-and-ratchet mechanism co-operating with the rod for selectively aligning it with an abutment adapted to displacement of the piston head.

The above and other objects, features and advantages of the present invention will become more readily apparent from the following description, reference being made to the accompanying drawing in which.

Figure 1:
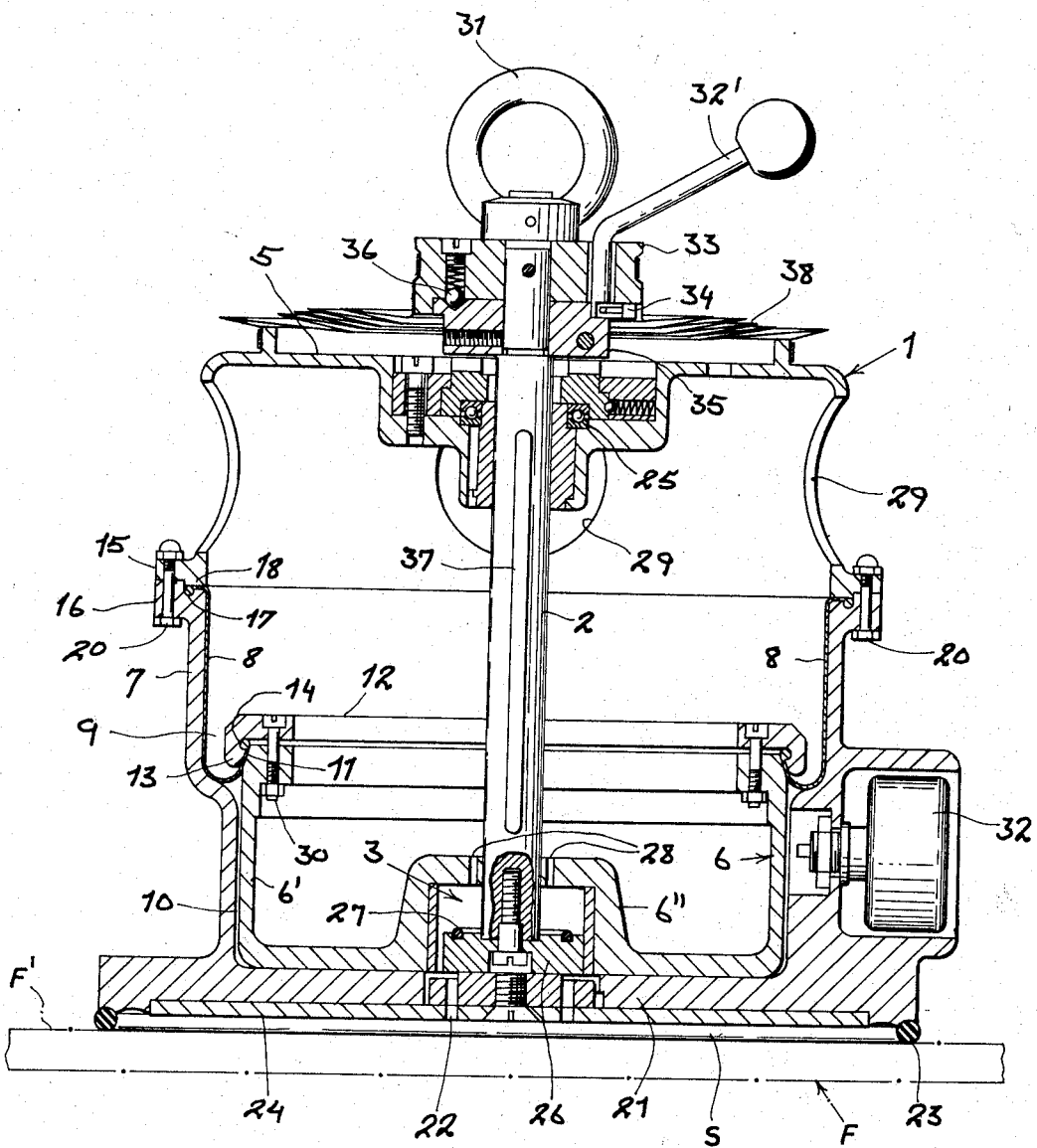
FIG. 1 is an axial cross-sectional view of a device for the raising and transportation of flat goods according to the invention.

In FIG. 1, I show a device for lifting flat goods diagrammatically illustrated at F which comprises a cylinder 1 consisting of an upper cylinder portion 5 and a lower cylinder portion 7 interconnected by bolts 20 at their adjoining annular flanges 15 and 16. The cylinder has a bottom wall 21 provided with a plurality of ports 22 communicating between the interior of the cylinder below a piston head 6 and a suction space defined by an annular resilient seal 23, the engaged surface F' of the goods and the bottom plate 24 of the cylinder. The piston head 6 has a generally cylindrical wall 6' and a hub 6" forming a venting valve generally designated by the reference numeral 3. A rod 2 is axially shiftable within the cylinder 1 and is disposed centrally therein with freedom of rotary movement in a bearing assembly 25 at the upper end of the cylinder 1. The lower extremity of rod 2 is enlarged by, for example, being provided with a plate-like valve member 26 having an annular sealing ring 27 of rubber or other elastomeric material surrounding an array of angularly spaced bores 28 formed in the hub 6" and communicating between the interior of the cylinder and the bores or openings 22 which, in turn, are connected within suction space S. The upper wall of the cylinder 1 is apertured at 29 so that the interior of the cylinder above the piston head 6 is at atmosphere pressure.

The piston head 6 is formed with an upwardly convergent conical sealing surface 11 against which a rollable flexible annular seal 8, in the form of a membrane, is clamped at its inner periphery by a hook-shaped flange 13 of a clamping ring 12; the latter is drawn against the body of the piston head 6 by a plurality of bolts 30. Above the hook portion 13, the ring or cover flange 12 is formed with an annular recess 14 receiving an annular bulge or bead along the inner periphery of the membrane 8. The membrane 8 lies along the inner wall of the lower cylinder portion 7 in the form of a sleeve or cuff and has its outer periphery fixed to the cylinder by being clamped between the cylinder portions 5 and 7. Thus, an outer peripheral bead of the membrane 8 is received in an axially open annular recess 17 in a surface of flange 16 extending transversely to the axis of the cylinder, while the other flange 15 is in all-around clamping engagement with the membrane 8 and is held thereagainst by bolts 20 and the enlarged annulus 18 of the upper cylinder portion 5.

The rod 2 is provided with an eye 31 engageable by the hook of a crane or other lifting device as described generally in our above-mentioned earlier application whereby the rod 2 can be drawn axially upwardly to elevate the piston head within the cylinder and produce a partial section in the compartment 10 below the membrane 8, the compartment 10 communicating with the suction space S via the openings 22. Earlier the valve plate 26 closes the vents 28 to permit a partial vacuum to develop in the suction space whereby the goods are elevated. A manometric or pressure-indicating means 32 communicates with the compartment 10 and is calibrated in units of weight of the goods to be carried for indicating the pressure within the compartment. It will be observed that the piston head 6 is received with play within the cylinder 7 and that an annular clearance is provided between them at 9 to accommodate the membrane 8. Frictional interengagement between the piston head and the cylinder is thus completely eliminated. In order to control the device, we provide a handle 32' rotatable in a head 33 and carrying a pawl 34 for the stepwise rotation of a ratchet 35 to successive positions in which the ratchet is releasably held by a detent 36. The ratchet forms an abutment means for a rib 37 on the rod 2 and, in alternating positions of the ratchet means engages this rib or key 37 to limit axial displacement of the rod and piston head 6 with respect to the cylinder, thereby suppressing the formation of a partial vacuum, and permitting the rod and key to move through the ratchet to develop the partial vacuum. A bellows 38 prevents dust and the like from accumulating between the cooperating means 32–37 and the bearing 25.

Figure 2:
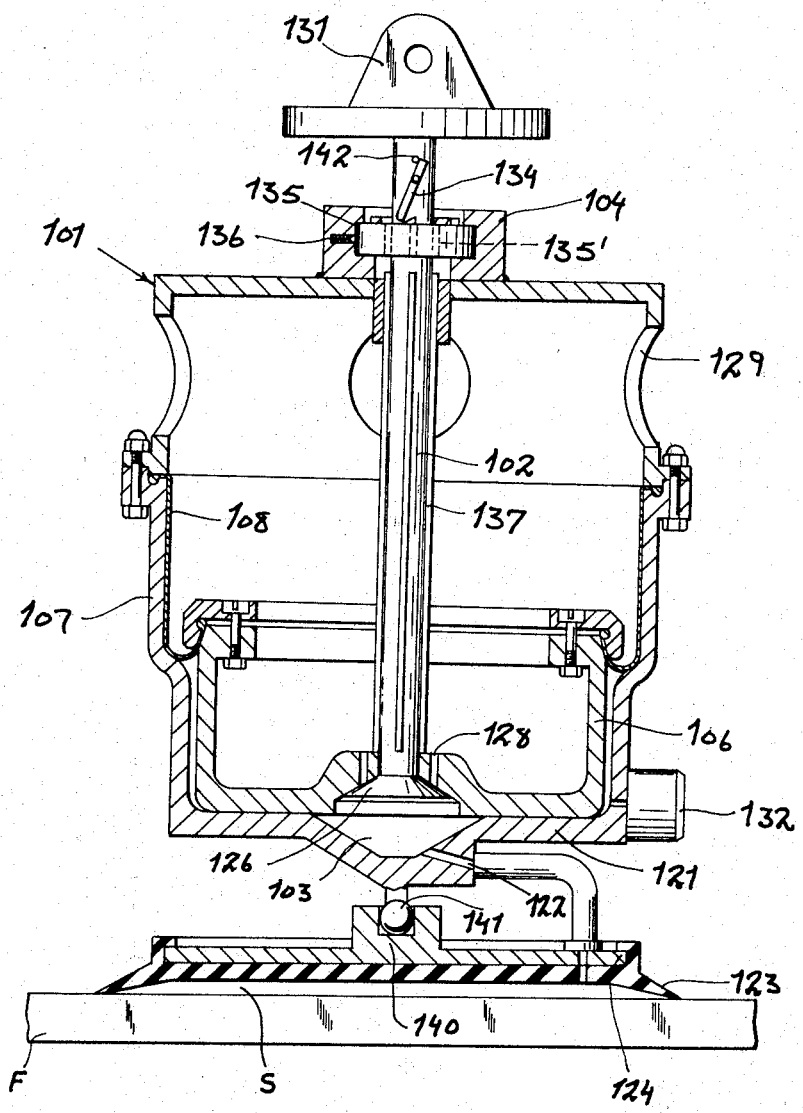
FIG. 2 is an axial cross-sectional view of another device of this type as described in the copending application but embodying the present improvement.

In FIG. 2 we show a system in which the development of the partial vacuum is automatic upon alternating reciprocations of the rod as described in our copending application. In this embodiment, the vertical cylinder 101 is provided with a piston head 106 received with clearance within the lower cylinder portions 107 and having a roll membrane 108 secured to the piston head 6 and the cylinder in the manner previously described. Here, however, a rod 102 projects upwardly through a central boss 104 in the top of the cylinder which is apertured at 129, and depends from a bracket 131 having a hole for engagement by a crane hook or other hoisting apparatus. The rod 102 terminates at its lower end in an enlarged extremity 126 receivable in a depression 103 of the cylinder bottom 121.

Depression 103, which encompasses the venting valve of this assembly communicates with an opening 122 which leads via a flexible tube into the recessed underside of a suction cup 124; the bottom recess or suction space S of the suction cup is defined by an annular flange 123 of resiliently deformable material (e.g. rubber) of outwardly tapering cross-section. Suction cup 124 has a neck 140 which forms a socket around a ball 141 centrally depending from the cylinder bottom 121; the swivel joint 140, 141 thus enables the cup 124 to adjust itself to the position of the flat object F to be engaged by its flange 123.

The rod 102 is formed with a plurality of longitudinal ribs or splines 137 (here four in number) which are equispaced about its periphery and are receivable in grooves 135' of a collar 135 forming a ratchet for alternately blocking and unblocking the ascent of the rod relatively to the cylinder 101. The stepping mechanism also includes a pair of pawls (one shown at 134) engageable with ratchet teeth of a collar 135 as fully described in said copending application each of these pawls being freely swingable about a respective pivot pin and cooperating with a stop pin 142 on the unsplined upper end of rod 102. The eight ratchet teeth define as many rotary positions of the collar 135 in which the latter is indexable by a spring-loaded ball check 136 engaging peripheral notches of the collar 135; in four of these positions the grooves of the ratchet are aligned with the splines of the rod whereas in the intervening four positions the continuous bottom of collar 11 forms an abutment for these splines which prevents the raising of the rod 102 for more than a short distance above its lowermost position. In that lowermost position, the enlarged extremity 126 of rod 102 enters the depression 103 of the cylinder bottom 121 so as to unblock a pair of venting channels 128 whereby the pressure above and below the piston heads 106 is equalized. A manometric device 132, bearing a scale calibrated in units of weight (e.g. pounds and kilograms) as shown in the copending application, is mounted on the outside of cylinder 101 at a level just above the bottom 121 and communicates with the interior of the cylinder via an orifice.

It will be understood that successive elevations and releases of the rod 102 will result in a stepping of the ratchet 135 to alternately permit axial displacement of the rod and suppress such displacement. Thus, in an operative position of the ratchet wherein the rod is displaceable, the device can engage the flat goods and elevate same while, upon lowering, the ratchet is stepped so that a following elevation of the unit will not again cause the device to lift the freshly deposited sheet.

Figure 3:
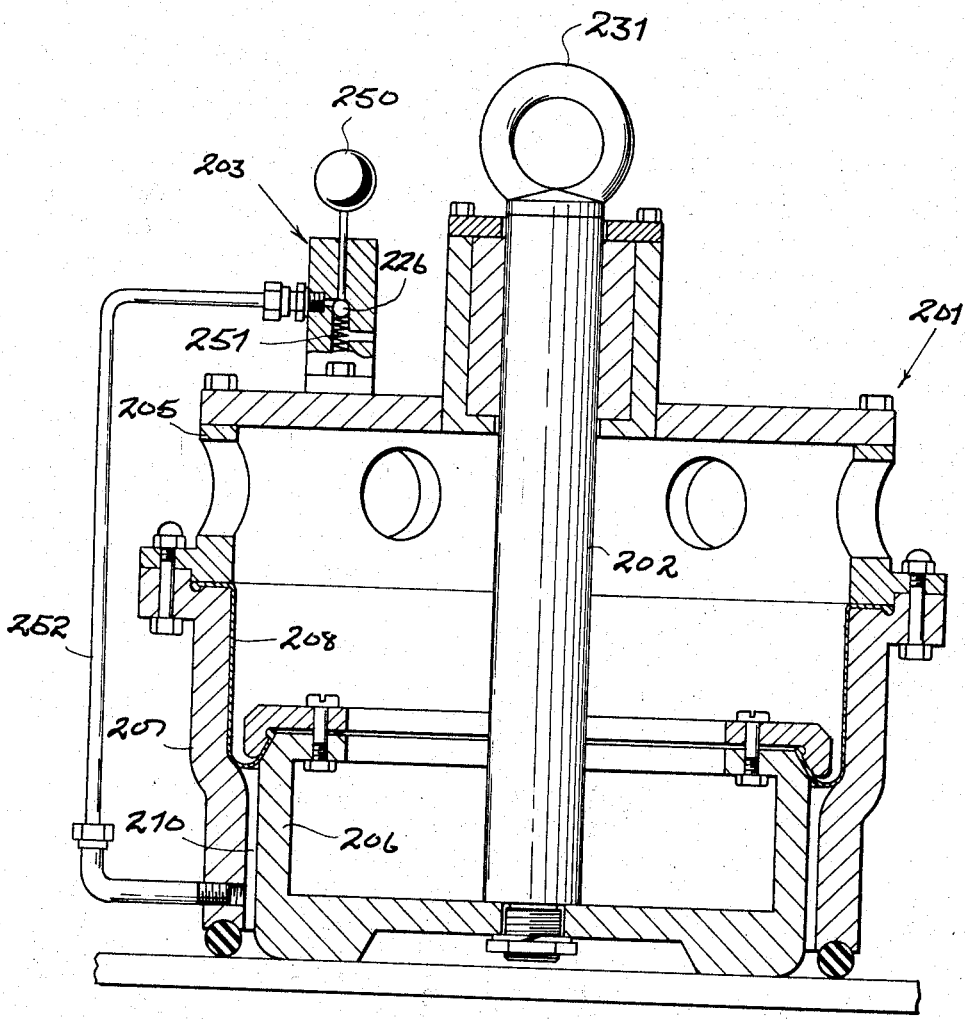
FIG. 3 is an axial cross-sectional view of a further modification having manually operable means for releasing the goods.
Figure 4:
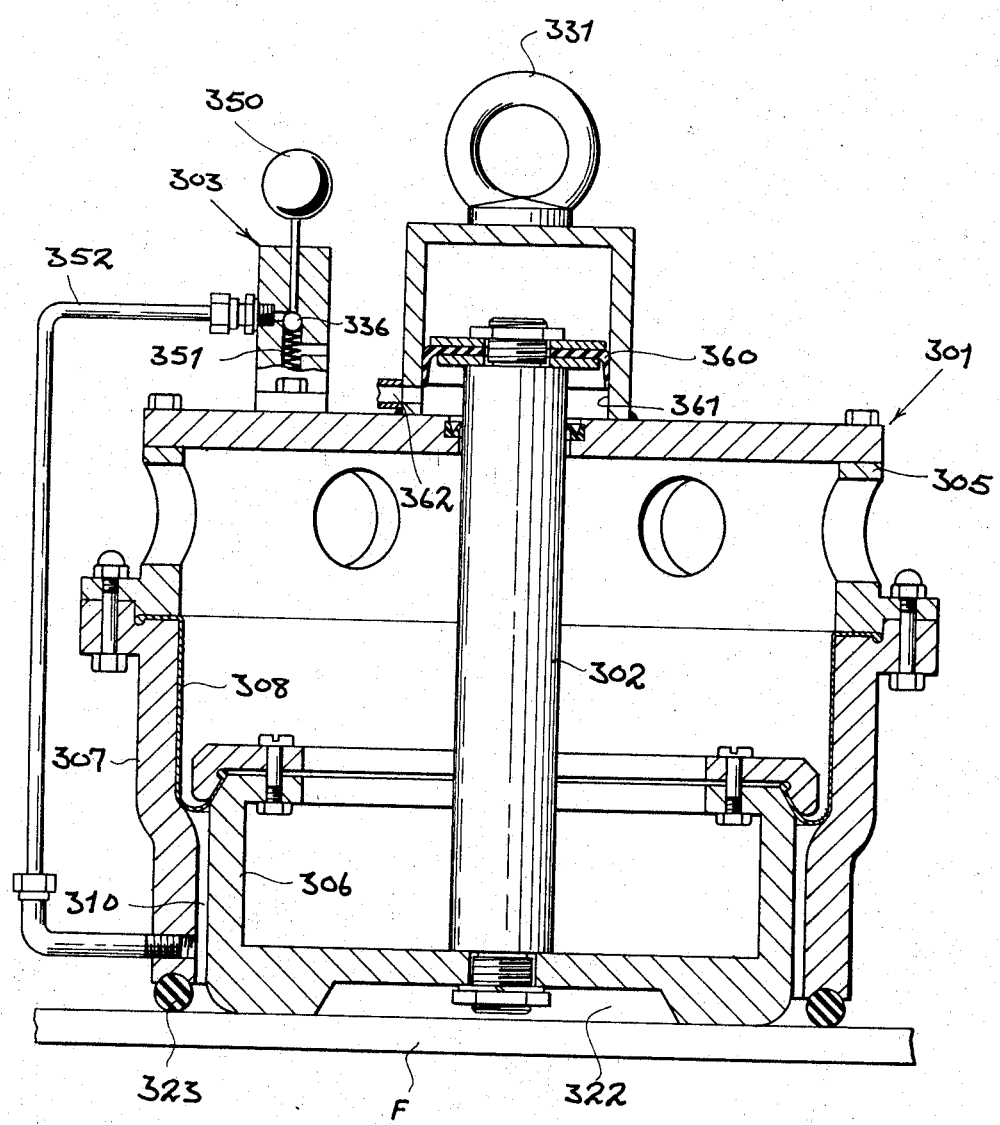
FIG. 4 is an axial cross-sectional view through another device according to the invention having similar manually operable means but equipped with a fluid-responsive device for operating the piston head.

In the systems of FIGS. 3 and 4, the membranes 208 and 308, respectively, are secured at their inner and outer peripheries to the piston heads 206, 306 and the cylinders 201, 301, respectively, between the axially connected cylinder portions 205, 305 and 207, 307, respectively. The clamping means have been fully described in connection with FIG. 1. In the embodiments of FIGS. 3 and 4, however, a manually operable element 250, 350 is provided for depressing respective valve members 226, 326 against the forces of restoring springs 251, 351. In each case, the valve means 203, 303 is mounted upon the top of the upper cylinder portions 205, 305 and is connected via a conduit 252, 352 with the compartment 210, 310 within the cylinder below the seal 208, 308. Depression of members 250, 350 will thus vent these chambers to the atmosphere and relieve the partial vacuum. Whereas in FIG. 3 the rod 202 is provided with a suspension eye 231 for axial displacement of the rod and the piston head 206 by the lifting mechanism, in the system of FIG. 4 the suspension means 331 is rigid with the upper cylinder portion 305 while a piston 360 is provided on the upper end of rod 302. Piston 360 is slidable within a cylinder bore 361 which can be supplied with a pressure medium via a duct 362 to displace the piston 360 and the rod 302 upwardly and generating a partial vacuum in the compartment 310; the cylinder is open downwardly at 322 to form a suction space surrounded by the rubber seal 323.

The systems of FIGS. 3 and 4 operate as previously described in connection with FIG. 1 except that, when it is desired to lift the unit without entraining a flat article upon which it is disposed, the operator merely actuates the valve 203 and 303 to prevent the development of the partial vacuum.

The invention described and illustrated is believed to admit of many modifications within the ability of persons skilled in the art, all such modifications being considered within the spirit and scope of the appended claims.

We claim:

1. A lifting device for flat goods, comprising:
a cylinder with a substantially vertical axis;
a piston head axially movable in said cylinder;
suspension means at an upper end of said cylinder for elevating same;
means for axially drawing said piston head upwardly within said cylinder for generating a partial vacuum therebelow, said cylinder being provided at its lower end with a suction head and an opening communicating between said suction head and said cylinder below said piston head; and
an annular flexible seal within said cylinder in all-around fixed peripheral engagement therewith and in all-around fixed peripheral engagement with said piston head, thereby forming a seal between said piston head and said cylinder whereby a partial vacuum is developed in said suction head and maintained upon elevation of said piston head within said cylinder away from said suction head.

2. A device as defined in claim 1 wherein said piston head is of generally cylindrical configuration and is affixed at an upper extremity to said annular flexible seal, said seal having an inner periphery engaged by said piston head and an outer periphery fixed to said cylinder at a location remote from said suction head.

3. A device defined in claim 2 wherein said piston head is formed with an annular surface, further comprising a clamping ring mounted on said piston head and clamping the inner periphery of said seal against said surface.

4. A device as defined in claim 3 wherein said surface is generally conical and upwardly convergent and said ring is formed with an annular recess proximal to said surface, the inner periphery of said seal being provided with an annular bead received in said recess upon clamping engagement of said ring with said seal and said piston head.

5. A device as defined in claim 1 wherein said cylinder comprises an upper cylinder portion and a lower cylinder portion, and fastening means for axially drawing said cylinder portions together, said seal having an outer periphery clamped between said cylinder portions.

6. A device as defined in claim 5 wherein at least one of said cylinder portions is provided with a sealing surface transverse to the axis of the cylinder and formed with an axially open annular recess, the outer periphery of said seal being provided with an annular bead received in said recess.

7. A device as defined in claim 1 wherein said seal is a rollable membrane lying along the inner wall of said cylinder in a lowered position of said piston head within said cylinder; said piston head being received with circumferential play in said cylinder.

8. A device as defined in claim 1 wherein the means for axially drawing said piston head upwardly includes a rod extending centrally within said cylinder, further comprising valve means selectively communicating between the space between said suction head and the flat goods engaged thereby and the atmosphere for venting said space to the atmosphere for release of the goods.

9. A device as defined in claim 8 wherein said rod is provided with said suspension means.

10. A device as defined in claim 9 wherein said valve means is provided with a manually operable element for selectively controlling the venting of said space to the atmosphere and the development of a partial vacuum below said piston head.

11. A device as defined in claim 9 wherein said valve means includes an axially shiftable valve member carried by said rod, said piston head being provided with an aperture communicating between said opening and the atmosphere and closable upon upward axial displacement of said rod by said valve member to block communication between said space and the atmosphere during elevation of the cylinder.

12. A device as defined in claim 9 wherein said suction head includes a resilient ring surrounding said opening and engageable with the flat goods to be lifted for defining with the goods and the suction head said suction space.

13. A device as defined in claim 9 wherein said cylinder is provided with abutment means positively engageable by said rod upon an upward movement thereof for limting the displacement of said piston head in upward direction and suppressing said partial vacuum, said rod and said cylinder being provided with cooperating means for aligning said abutment means with said rod upon alternate reciprocations of said rod relatively to said cylinder.

14. A device defined in claim 13 wherein said cooperating means includes pawl means on said rod and ratchet means on said cylinder adapted to be rotatably stepped by said pawl means, said abutment means being rigid with said ratchet means.

15. A device as defined in claim 8 wherein said rod is provided with a piston head in the upper extremity thereof and said cylinder forms a cylinder bore for said piston, further comprising means for introducing a pressure medium into said bore for axially displacing said piston and said rod to draw said rod and said piston head upwardly.

16. A device as defined in claim 8 wherein said cylinder is provided with pressure-responsive means communicating with the interior of said cylinder at a lower portion thereof and thereby communicating with said opening while being calibrated in units of weight.

References Cited

UNITED STATES PATENTS

| | | | |
|---|---|---|---|
| 897,060 | 8/1908 | Cash | 294—64 |
| 1,294,103 | 2/1919 | Hitchcock | 294—64 |
| 2,198,976 | 4/1940 | Rober | 294—64 X |
| 2,969,968 | 1/1961 | Miller | 177—208 X |
| 3,061,351 | 10/1962 | Johnson | 294—64 |
| 3,089,519 | 5/1963 | Bradley | 177—208 X |

FOREIGN PATENTS

| | | |
|---|---|---|
| 1,180,807 | 1/1959 | France. |
| 122,139 | 8/1927 | Switzerland. |

RICHARD B. WILKINSON, *Primary Examiner.*

R. S. WARD, *Assistant Examiner.*